US00RE35001E

United States Patent [19]

Grow

[11] E Patent Number: Re. 35,001

[45] Reissued Date of Patent: Jul. 25, 1995

[54] WRITE TOKEN REGENERATION IN A TIMED TOKEN RING

[76] Inventor: Robert M. Grow, 8708 Twin Trails Dr., San Diego, Calif. 92129

[21] Appl. No.: 857,112

[22] Filed: Mar. 24, 1992

Related U.S. Patent Documents

Reissue of:

[64] Patent No.: 4,593,280
Issued: Jun. 3, 1986
Appl. No.: 402,098
Filed: Jul. 26, 1982

U.S. Applications:

[60] Continuation of Ser. No. 617,441, Nov. 20, 1990, abandoned, which is a continuation of Ser. No. 418,910, Oct. 5, 1989, abandoned, which is a continuation of Ser. No. 201,707, Jun. 2, 1988, abandoned, which is a division of Ser. No. 355,021, Mar. 5, 1982, Pat. No. 4,404,557.

[51] Int. Cl.[6] ..... H04Q 5/00; H04J 3/06

[52] U.S. Cl. ..... 340/825.05; 370/85.1; 375/368

[58] Field of Search ..... 340/825.5, 825.05, 825.51; 370/16, 17, 84, 86–94, 102–103, 105, 106; 375/106, 116, 117

[56] References Cited

U.S. PATENT DOCUMENTS

| | | | |
|---|---|---|---|
| 3,597,549 | 8/1971 | Farmer . | |
| 3,903,371 | 9/1975 | Colton et al. . | |
| 4,001,504 | 1/1977 | Hendrickson . | |
| 4,103,288 | 2/1978 | Westman | 340/825.05 |
| 4,161,719 | 7/1979 | Parikh et al. | 375/116 |
| 4,237,553 | 12/1980 | Larsen | 370/89 |
| 4,251,880 | 2/1981 | Baugh et al. | 370/86 |
| 4,287,592 | 9/1981 | Paulish et al. | 370/94 |
| 4,316,284 | 2/1982 | Howson | 375/116 |
| 4,320,520 | 3/1982 | Graham | 370/84 |
| 4,335,426 | 6/1982 | Maxwell et al. | 340/825.05 |
| 4,344,180 | 8/1982 | Cummiskey | 370/86 |
| 4,346,440 | 8/1982 | Kyu | 370/86 |
| 4,491,946 | 1/1985 | Kryskow, Jr. et al. | 340/825.5 X |
| 4,498,131 | 2/1985 | Bratt et al. . | |

FOREIGN PATENT DOCUMENTS

| | | | |
|---|---|---|---|
| 0006325 | 9/1980 | European Pat. Off. | 340/825.2 |

OTHER PUBLICATIONS

"A Reliable Token-Ring System for Local-Area Communication," Werner Bux et al., Published in vol. 1 of the NTC Record—1981, National Telecommunications Conference, New Orlearns, La., No. 29 to Dec. 3, 1981 pp. A2.2.1–A2.2.6.

*Primary Examiner*—Ulysses Weldon
*Attorney, Agent, or Firm*—Townsend and Townsend Khourie and Crew

[57] ABSTRACT

Disclosed is a bidding method for regenerating a lost write token in a token controlled loop communications network. In response to a station on the loop detecting the loss of the write token, the station will generate a unique recovery token specifying as the destination address that station's individual address and transmit the generated recovery token onto the loop. Stations receiving the recovery token will examine the recovery token's destination address and based on a bidding method, will either pass the recovery token on unaltered or substitute the receiving station's individual address if the recovery token's destination address is not equal to the receiving station's individual address. When a receiving station's individual address matches that specified in the recovery token, that station wins the bid and generates a new write token.

The method disclosed can also be used to generate a write token when the network is initialized.

29 Claims, 4 Drawing Sheets

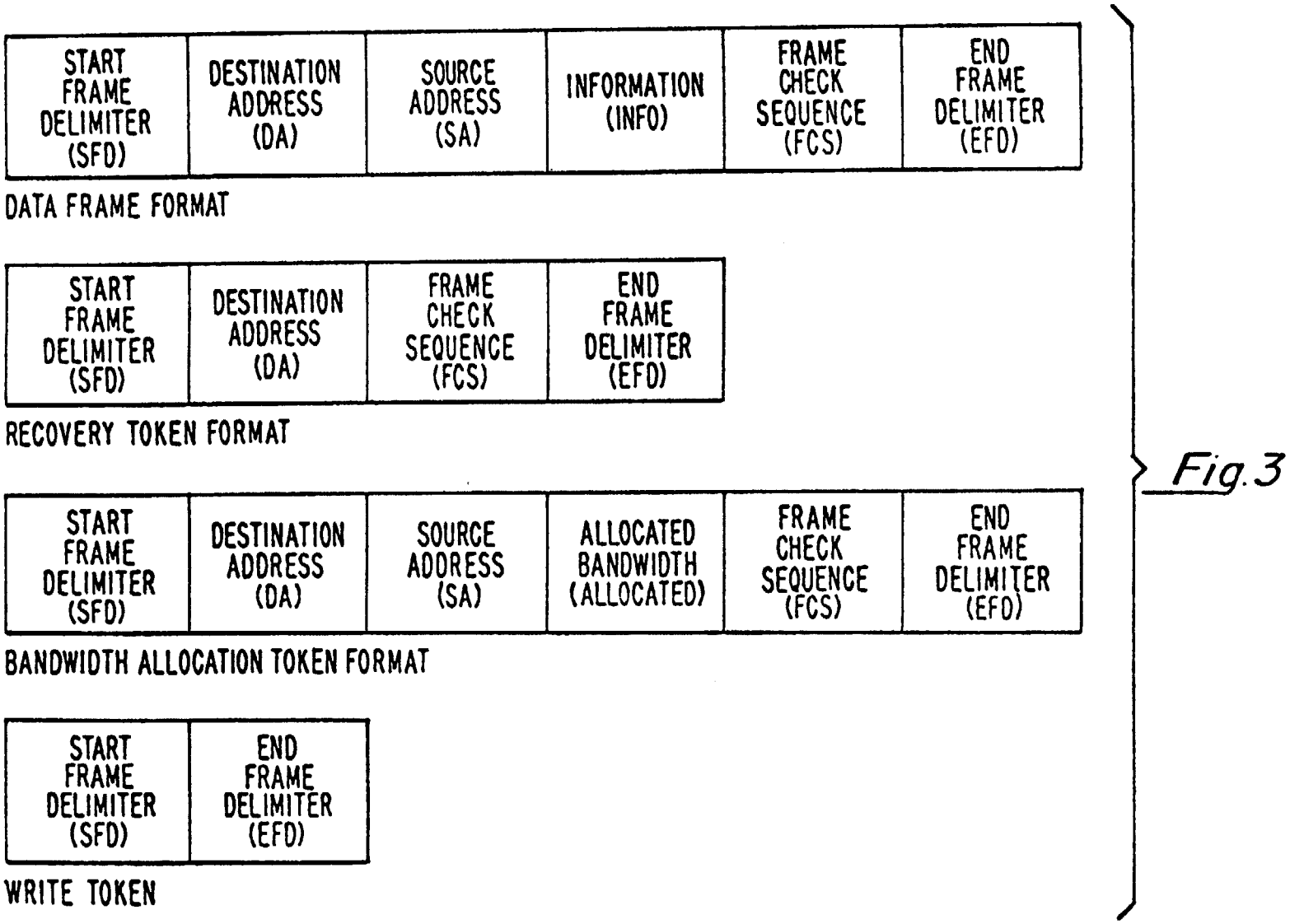
Fig. 3
START FRAME DELIMITER (SFD)
DESTINATION ADDRESS (DA)
SOURCE ADDRESS (SA)
INFORMATION (INFO)
FRAME CHECK SEQUENCE (FCS)
END FRAME DELIMITER (EFD)
DATA FRAME FORMAT
START FRAME DELIMITER (SFD)
DESTINATION ADDRESS (DA)
FRAME CHECK SEQUENCE (FCS)
END FRAME DELIMITER (EFD)
RECOVERY TOKEN FORMAT
START FRAME DELIMITER (SFD)
DESTINATION ADDRESS (DA)
SOURCE ADDRESS (SA)
ALLOCATED BANDWIDTH (ALLOCATED)
FRAME CHECK SEQUENCE (FCS)
END FRAME DELIMITER (EFD)
BANDWIDTH ALLOCATION TOKEN FORMAT
START FRAME DELIMITER (SFD)
END FRAME DELIMITER (EFD)
WRITE TOKEN

WRITE TOKEN REGENERATION IN A TIMED TOKEN RING

Matter enclosed in heavy brackets [ ] appears in the original patent but forms no part of this reissue specification; matter printed in italics indicates the additions made by reissue.

[This application is a division, of application Ser. No. 355,021, filed Mar. 5, 1982 now U.S. Pat. No. 4,404,577.] *This is a Continuation of reissue application Ser. No. 07/617,441 filed Nov. 20, 1990, now abondoned which is a cont. of 07/418,910, filed Oct. 5, 1989 now abn, which is a cont. of 07/201,707 filed Jun. 2, 1988 now abn, which is a div. of 06/355,021, filed Mar. 5, 1982 now U.S. Pat. No. 4,404,557 and a reissue of 06/402,098 Jul. 26, 1982 now U.S. Pat. No. 4,593,280.*

BACKGROUND OF THE INVENTION

The present invention relates in general to a system and method for communicating information between distributed stations. More particularly, the present invention relates to a timed token loop which provides three or more classes of service with a priority relationship between classes. The three classes of service provided allow guaranteed bandwidth, interactive and batch services. These classes are implemented by timing the rotation time of a write token to measure instantaneous load and limiting transmission of information by class of service and the observed write token rotation time.

The synthesis of the architecture for future office automation systems will be effected to a large extent by the available communication mechanisms supporting those systems. Circuit switched communication as provided by PBXs is efficient for handling voice traffic, but is limited by the maximum bandwidth available for data traffic. The inefficiencies inherent in using circuit switched service for communication of bursty data traffic are being solved for low data rate devices through submultiplexing in the PBX. In contrast, local area networks have been optimized for efficient transmission of data at high burst rates with little consideration for handling of digital voice.

Broadband systems provide the capability for carrying both voice and data over the same media through separate logical networks for voice and data on the same physical media. This hybrid approach solves some problems by using a single media, but does not allow the flexibility given by integration of data on the same logical network.

Distributed communication systems based on token loop structures are well known in the prior art. Thus, in the article by David J. Farber titled "A Ring Network", Datamation, February 1975, pp. 44–46, a collection of minicomputers connected by a ring-like digital communication system is disclosed. Similarly, the work by Newhall and Farmer on token controlled rings is exemplified in a paper titled "An Experimental Distributed Switching System to Handle Bursty Computer Traffic", in Proc. ACM Symp. Problems in the Optimization of Data Communications Systems (Pine Mountain, Ga., October 1969), pp. 31–34.

The work of both Newhall and Farber was primarily applicable to data type traffic where all stations were given an essentially equal opportunity to transmit. Thus the drawback of both systems is that they cannot support a guarantee of bandwidth.

The inability to guarantee bandwidth is also a drawback of the Ethernet system and all CSMACD-type protocols for local area networks.

The Cambridge ring, which is based on the work of Pierce, is more adapted to a circuit type of service. In such a system, you essentially have a boxcar (which corresponds to available bandwidth) into which data may be inputted or extracted. A fixed allocation procedure may be implemented which reserves the boxcar for a station to use. The drawback of the Cambridge ring is that there's no simple or obvious way to use the boxcar when its not being used by the station that has a fixed reservation on it.

It is the general object of the present invention to overcome these and other drawbacks of the prior art by providing a timed token protocol method and apparatus which integrates the favorable characteristics of both circuit switched and packet switched communications and provides these characteristics to a station through a single physical and logical interface.

It is another object of the present invention to provide a protocol adaptable to either a physical or logical loop which provides three or more classes of service with a priority relationship between classes, the three classes allowing guaranteed bandwidth, interactive and batch services.

It is still another object of the present invention to provide a timed token protocol for a loop communications network which allows the bandwidth guaranteed to a first station to be used by that first station when needed and further allows the same guaranteed bandwidth to be used by another station when it is not needed by the first station.

It is yet another object of the present invention to provide a token controlled loop which provides efficient utilization of available bandwidth by the stations configured on the loop.

It is an additional object of the present invention to provide a timed token protocol adaptable to either a physical or logical loop which provides for stations configured on the loop, each station being of one or more of the multiple classes of priority.

It is a further object of the present invention to provide a timed token protocol for stations interconnected in a continuous loop structure, the protocol providing for stations with different priority levels, wherein stations of the highest priority level are capable of allocating a guaranteed minimum bandwidth to themselves to the exclusion of other stations of the same priority.

It is still a further object of the present invention to provide a timed token protocol for stations interconnected in a continuous loop structure, the protocol providing for stations with different priority levels, wherein stations not of the highest but of equal priority level are guaranteed a pool of bandwidth which may be fairly shared between them.

These and other objects, features and advantages of the present invention will become more apparent from the detailed description of the preferred embodiment when read in conjunction with the drawings.

SUMMARY OF THE INVENTION

According to the invention, a timed token protocol is provided to allow for the integration of three or more classes of service on the same loop communications network. The highest class of service (Class 1) is for information which requires a guarantee of bandwidth and/or deterministic delay and jitter characteristics. This class of service is used for information that is represented in the time domain (e.g., pulse code modulated voice), or where minimal queuing delay is important (e.g., process control). The second class of information (Class 2) is that which is non-real time, but of an interactive nature. Traditional data communications between terminals and computers falls into this classification. That is, Class 2 information requires some minimum throughput, but the absolute guarantee of bandwidth is not a requirement. The third class of service (Class 3) is for batch information where no minimum throughput is required and transmission of information may be delayed until network load is light.

The timing of a write token is the mechanism used for measuring instantaneous load. The measurement of load allows for the establishment of the three classes of service. Each class of service uses a different set of rules for determining when information may be transmitted.

An initial value called the target token rotation time (TTRT) must be selected for the network. The network protocols are designed so that under 100% offered load, the write token will revolve at the TTRT. The TTRT must be chosen to be less than or equal to the rate at which devices operating at a Class 1 priority require service.

As in all token controlled communications systems, the right to service new information into the network is controlled by passing a priviledge to transmit (the write token) from one station to another. The passing of the write token is controlled by the communication protocol.

Class 1 (C1) information may be transmitted upon every write token reception. The amount of C1 information transmitted with each write token reception is limited by a bandwidth allocation procedure to be explained below. Other classes of information control their transmission by using a timer for each class. The timer for Class 2 is the target token rotation time minus the time for transmission of the maximum length frame (TTRT - MAXFRAME) (or the Class 2 target time). The target time for Class 3 would be some percentage of the target token rotation time related to load minus the maximum sized frame transmission time; (e.g., $0.6 \times TTRT - MAXFRAME$).

Stations of Class 2 or lower priority control their transmission of information by timing between arrivals of the write token. Each time the write token arrives at a station, priority class timers are reset to their initial values if no information is to be transmitted, and the write token is passed on unimpeded. If, at arrival of the write token, timers have not decremented to zero and information is queued for transmission, queued information may be transmitted for any priority class (other than Class 1) with a non-zero timer value.

A station which simultaneously services multiple classes of information transmits lowest priority first and highest priority last. For example, in a station which has Class 1, Class 2 and Class 3 traffic, if when the write token arrives the Class 3 (C3) timer has not decremented to zero, the residual value in the C3 timer is loaded into a token holding timer, the C3 timer is reset, and all timers continue to decrement. New frames may be sourced at C3 priority level onto the ring as long as the token holding timer has not decremented to zero. When the holding timer has decremented to zero, the current frame in transmissionis completed. At that time the residual in the Class 2 (C2) timer is loaded into the holding timer and the C2 timer is reinitialized. Transmission of C2 information then proceeds as described for C3. Class 1 (C1) information is then transmitted. The write token is transmitted after all the allowed C1 frames. If at write token arrival the C3 timer had decremented to zero, the protocol begins with service to Class 2. If both the C3 and C2 timers had decremented to zero, transmission begins with C1.

At design or configuration time, parameters must be chosen to allow for the quality of service desired for the classes of information. A value representing allocatable bandwidth is used for the control of Class 1 traffic. This value (ALLOC) is less than the target token rotation time. The amount of difference depends upon two factors. One is the amount of bandwidth wished for Class 2 devices to guarantee minimum throughput (C2POOL), and the other is the latency (LATEN) of the physical or logical ring. Latency is the amount of time it takes for the token to go around the ring with zero load. The sum of allocatable bandwidth, the Class 2 pool, and latency is equal to the target token rotation time ($TTRT = ALLOC + C2POOL + LATEN$). Normally the timer value for Class 3 would be less than the available bandwidth for Class 1 ($C3TIMER < ALLOC$). In such case, no minimum bandwidth is guaranteed for Class 3. If the C3 timer is greater than allocatable bandwidth, some minimum bandwidth has been guaranteed for Class 2 or Class 3.

By limiting traffic through the described mechanisms, Class 1 service is that of a minimum guaranteed bandwidth, since the guarantee is for each Class 1 station that has received a portion of the allocatable bandwidth to be able to transmit some fixed amount of information every rotation of the write token. If the write token is rotating faster than the target token rotation time, the bandwidth usable by Class 1 would therefore be greater than the guaranteed minimum.

Class 2 devices have a pool of bandwidth guaranteed to them which is shared fairly by all devices designed to use that quality of service. In addition, the timing of the write token allows any unused Class 1 bandwidth to be used by lower priority stations. This includes both allocated and unused bandwidth as well as unallocated Class 1 bandwidth. Class 3 priority has no guaranteed throughput, but would only transmit when the load falls below the arbitrary percentage established for that class.

In the preferred embodiment, the mechanism for allocation of bandwidth for Class 1 service is to use a special token which is transmitted around the loop. When a Class 1 station desires to allocate additional bandwidth to itself, the write token is captured and a bandwidth allocation token is transmitted. Each station on the loop takes this bandwidth allocation token, adds to it the amount of bandwidth which is currently allocated by that station for Class 1, and forwards the allocation token to the next station. When the bandwidth allocation token returns to the station attempting to allocate bandwidth, the write token is regenerated and passed on to the next station. If the current allocation of bandwidth returned in the bandwidth allocation token plus the desired allocation is less than the allocatable bandwidth, then the allocation is granted. The bandwidth desired is then added to the total allocated for that station.

The timing of the write token is also utilized to determine if the write token has been lost. If the time since the previous arrival of a write token at a station is greater than two times the target token rotation time, the station will initiate a bidding cycle to recover the write token.

In addition to the present invention providing a protocol method for the integration of different classes of service on the same communication network, a preferred hardware embodiment of the station logic is also described. Details of the hardware implemention is contained in the detailed description of the preferred embodiment.

BRIEF DESCRIPTION OF THE DRAWINGS

FIG. 3 shows the formats of the data frame, recovery token, bandwidth allocation token and write token as used in the preferred embodiment of the present invention.

DETAILED DESCRIPTION OF THE PREFERRED EMBODIMENT

Figure 1:
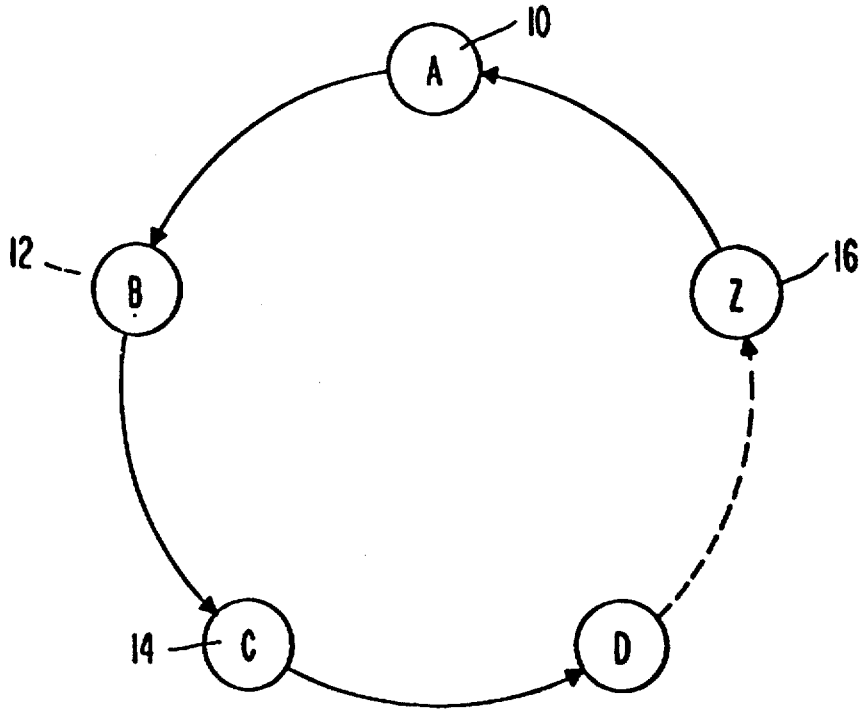
FIG. 1 illustrates the interconnection of a plurality of stations in a communications loop as employed in the present invention.

The protocol of the present invention is designed to operate in a token controlled loop (or ring) communications network. Those skilled in the art will appreciate that the protocol of the present invention may be implemented either on a physical loop or on a logical loop (or ring) superimposed on a physical bus. Such a loop communications network may utilize a single loop (or ring) architecture or one incorporating a second redundant loop with network components that route the data around any network faults. The following description will consider the implementation of the present invention in a single loop architecture. However, those skilled in the art will appreciate that the present invention may be readily adapted for use in loop architecture employing a second redundant loop.

The timed token protocol of the present invention allows for the integration of different classes of service on the same communications network. The preferred embodiment of the protocol supports three basic priority classes of service. The first class (Class 1) is for that type of information which requires a guarantee of bandwidth and deterministic delay and jitter characteristics. This class of service is used for information which is represented in the time domain. Thus, for example, Class 1 information may include real-time audio applications such as pulse code modulated (PCM) voice. Such Class 1 information is sometimes referred to as synchronous information.

The second priority class of information (Class 2) supports non-real time applications requiring interactive response. Typical of such an application is traditional data communications between terminals and a computer. Thus, in this class some minimum throughput is required, but an absolute guarantee of bandwidth is not a requirement. This class of traffic is sometimes referred to as asynchronous.

The third class of service (Class 3) is that of batch traffic which requires no minimum throughput, but can be transported through the network when load is light. Background communications such as electronic mail or file transfers are typical applications where Class 3 service would be appropriate. The protocol of the present invention allows for the creation of additional priorities within this class of service for batch traffic. Thus, Class 4—Class N, all subclasses of Class 3, may be established.

As will be discussed below, the timing of a write token is the mechanism used for measuring instantaneous load on the loop. This measurement of load allows for the establishment of the classes of service discussed above. Each class of service uses a different set of rules for determining when information may be transmitted.

The speed at which the write token rotates around the loop determines the rate at which the network services each station, the network's queuing delay, and the bandwidth lost to passing the write token from station to station. An initial value called the target token rotation time (TTRT) must be selected for the network. The loop protocols guarantee that the short-term average rotation time will vary from the minimum orbit time with no load, to the target token rotation time (TTRT) under full load conditions. The TRTT is important since it defines the maximum average write token rotation time. Thus, under 100% offered load, the write token will revolve at the TTRT. In the preferred embodiment of the present invention, the TTRT is loaded into each station during network initialization.

The TTRT is related to the rate at which devices operating at a Class 1 priority require service. For Class 1 priority, information may be transmitted once every write token arrival. Thus, the protocol guarantees that Class 1 (C1) information may be sent at least once every TTRT for each Class 1 station on the loop that has received a guarantee of bandwidth. This means that the TTRT determines the guaranteed service rate for C1 transmissions.

As previously mentioned, the TTRT is related to the rate at which devices operating at a Class 1 priority require service. For example, if service is only required every eight milliseconds, a 64K bits per second information rate would be transmitted using a packet size of 64 bytes (or 512 bits). Thus, the time to accumulate 512 bits at a rate of 64K bits/second is 8 milliseconds. If the information generation rate was 32K bits per second instead of 64K bits per second (bps), a packet size of 32 bytes (or 256 bits) would be used with this eight millisecond TTRT. Similarly, a chosen service time of four milliseconds would require 32 bytes (or 256 bits) per packet to support a 64K bps information rate, or 16 bytes (or 128 bits) per packet for a 32K bps information rate.

The value used for the target token rotation time must be less than or equal to the selected service time in order to guarantee that each station is serviced within the selected service time. If error free bandwidth is desired for Class 1, the error rate of the media must be taken into consideration. in such case, the target token rotation time would be correspondingly less than the rate at which packets are produced.

As in all prior art token controlled communications systems, the right to source new information into the network of the present invention is controlled by passing a privilege to transmit (or write token) from one station to another. In the present invention, the passing of the write token is controlled by the communication protocol.

FIG. 1 shows a single loop communications system as employed in the present invention. In such a system, station A 10 passes a write token to station B 12, station B 12 passes the write token to station C 14—and station Z 16 passes the write token to station A 10, and the cycle is thereafter repeated.

Each station on the loop may interconnect devices for handling one or more priority classes of data. Thus, a single station may handle classes 1 or 2 or 3, or any combination of the three classes.

Class 1 information may be transmitted upon every write token reception by a Class 1 station. The amount of C1 information that a Class 1 station may transmit upon each write token reception is limited by a bandwidth allocation procedure to be explained below. Other classes of information transmission are controlled by using a timer for each class, each station capable of transmitting non-Class 1 information must have a timer for each non-class 1 priority of information it is capable of transmitting.

The initial value (or target time) for each Class 2 timer is set to the target token rotation time (TTRT) minus the time for transmission of the maximum length frame (TTRT-MAXFRAME). As will be obvious to those skilled in the art, MAXFRAME is dependent on the quality of crystals used in the network, the amount of padding inserted between frames, the coding and synchronization system utilized, and other characteristics of the network. If the network uses a central clock, the maximum length frame could be arbitrarily long. In the preferred embodiment of the invention, the maximum length frame has been chosen to be 1024 bytes in the information field.

In the preferred embodiment, the timer value for Class 2 is chosen to assure efficient network utilization and prevent starvation of stations. Thus, if the timer value for Class 2 is not TTRT-MAXFARE, the network will give smaller frames a greater probability of transmission. This would tend to encourage inefficient network utilization since the overhead to information ratio is higher for smaller frames. It also might prevent some Class 2 stations from transmitting at all.

The target time for every Class 3 timer is set to some percentage of the target token rotation time minus the maximum sized frame transmission time. For example, the target time for Class 3 might be $0.6\times TTRT-MAXFRAME$. The percentage of the TTRT used in the calculation of the Class 3 target time is related to the load on the network. Thus, each timer within the same Class is set to the same initial value, the value being set when the network is configured.

The timer value for any other priorities of batch information would follow the same pattern as used for Class 3, with each priority using a smaller percentage of TTRT for its initial timer value. For example, if a Class 4 priority was included, the initial Class 4 timer value (or target time) might be $0.4\times TTRT-MAXFRAME$.

Note that in the present invention all timers in all stations are continually decrementing until they have decremented to zero (at which time a timer ceases to decrement).

Stations of Class 2 or lower priority control their transmission of information by timing the write token from arrival to arrival. Each time the write token arrives at a station, priority class timers are reset to their initial values. If no information is to be transmitted, the write token is passed back onto the loop unimpeded. If, at arrival of the write token, the timers have not decremented to zero and information is queued for transmission, queued information may be transmitted for any priority class (other than Class 1) whose corresponding timer has a non-zero value. Thus, a station can transmit Class 2 (or Class 3) information as long as the time since the previous write token arrival is less than the Class 2 (or Class 3) target time. If the write token arrives later than a Class 2 (or Class 3) target time since its previous arrival, the station must refrain from transmitting any Class 2 (or Class 3) information onto the loop.

A station which simultaneously services multiple classes of information transmits lowest priority first and highest priority last. For example, in a station which has Class 1, Class 2 and Class 3 traffic, when the write token arrives, if the timer for Class 3 has not decremented to zero, the residual value in the Class 3 timer is loaded into a token holding timer, the Class 3 timer is simultaneously reset to its initial value, and the Class 3 timer and token holding timer immediately begin to decrement. Note that during this time the Class 2 timer and all timers in other stations are continuously decrementing. Multiple new frames may be sourced at Class 3 priority level onto the loop as long as the token holding timer has not decremented to zero.

When the token holding timer has decremented to zero, the current Class 3 frame in transmission is completed. At that time the residual value in the Class 2 timer is loaded into the token holding timer, the Class 2 timer is simultaneously reset to its initial value, and the Class 2 timer and token holding timer immediately begin to decrement. Note that during this time the Class 3 timer and all timers in other stations are continually decrementing. Transmission of Class 2 information then proceeds in the same manner as described for Class 3, the transmission of Class 2 information ceasing after completing transmission of the frame being transmitted when the token holding timer goes to zero.

Note that if at the time the write token arrives there is no Class 2 information to transmit, the Class 2 timer still would not be reset until after Class 3 is serviced.

After Class 2 transmission is ended, the station next transmits Class 1 information. Details of when Class 1 information may be transmitted will be discussed below. After all of the allowed Class 1 frames have been transmitted, the write token is retransmitted back onto the loop.

Note that in the above description, if at the arrival of the write token the C3 timer had already decremented to zero or there was no Class 3 information to transmit, the station would immediately reset the C3 timer to its initial value and begin with service to Class 2. If when the write token arrived both the Class 3 and Class 2 timers had decremented to zero or there was no Class 2 or Class 3 information to transmit, the station would immediately reset the C2 and C3 timers and transmission would begin with Class 1 information.

To improve the fairness within a class of service, a method of accumulating lateness is preferred. Such a method may be optionally implemented in the present invention as follows. Thus, after transmission of Class 2 (or Class 3) information, if on the next rotation of the write token the timer for a class that transmitted decrements to zero, it will cause a class lateness register (not shown) to increment until write token arrival. This lateness must be removed before transmission can occur for that class again. The measure of token earliness (the residual of the target timer normally transferred to the token holding timer) is subtracted from the lateness register. This continues until the lateness has been compensated for by earliness. Then transmission can resume either on the same rotation that lateness is completely removed or on the next rotation after lateness is completely removed.

When the network is configured, parameters must be chosen to allow for the quality of service desired for the classes of information. As previously mentioned, the amount of Class 1 information that may be transmitted upon each write token reception is limited by a value representing allocatable bandwidth. This value, ALLOC, is less than the target token rotation time. The amount that ALLOC differs from the target token rotation time is dependent on three factors. These three factors are the amount of bandwidth to be allocated for Class 2 devices to guarantee minimum throughput (C2POOL), the latency (LATEN) of the physical or logical ring, and any bandwidth for system administration (SYSADM). System administration would include functions required to construct a logical loop or for bandwidth allocation procedures. Latency (LATEN) is the amount of time it takes for the token to go around the loop with zero load. The sum of allocatable bandwidth (ALLOC), the Class 2 pool (C2POOL), latency (LATEN) and system administration (SYSADM) is equal to the target token rotation time. Thus, $$TTRT = ALLOC + C2POOL + LATEN + SYSADM$$

In practice, latency and system administration will be a small factor for most systems. Thus, allocatable bandwidth (ALLOC) is selected primarily on how much Class 2 traffic is anticipated on the loop. By selecting the size of C2POOL, you determine the minimum throughput per Class 2 station. The remainder (ALLOC) is the bandwidth which is available for all Class 1 (C1) traffic.

Normally, the timer value for Class 3 and any lower priority classes will be less than the available bandwidth for Class 1 (C3TIMER<ALLOC). In such case, no minimum bandwidth is guaranteed for Class 3. If this is not the case, then the actual Class 2 pool (C2POOL) is $$\begin{aligned} C2POOL &= TTRT - LATEN - (C3TIMER - ALLOC) \\ &= TTRT - LATEN - C3TIMER + ALLOC \end{aligned}$$

Thus, if the Class 3 timer value is greater than the allocatable bandwidth, some minimum bandwidth has been guaranteed for Class 2 or Class 3.

Class 1 service is that of a minimum guaranteed bandwidth. Each Class 1 station that has received a portion of the allocatable bandwidth (ALLOC) guarantees it will be able to transmit some fixed amount of information corresponding to the size of its allocation for every rotation of the write token. Thus, if the write token is rotating faster than the target token rotation time, the bandwidth usable by Class 1 stations would be greater than the guaranteed minimum bandwidth available for Class 1 information.

The pool of bandwidth guaranteed to Class 2 stations (C2POOL) is shared by all stations designed to use Class 2 service. In addition, the timing of the write token allows any unused Class 1 bandwidth to be used by lower priority stations. This is accomplished by lower priority stations timing the write token and measuring load as previously described. Thus, when the write token arrives at a lower priority station, the token holding timer basically says how much bandwidth was not used on the last rotation. Note that this has no bearing on what is allocated or what was even allocatable; it is just what was used, and so by measuring the current load (via the C2 and C3 timers) lower priority stations are able to use that unused Class 1 bandwidth which is either not allocated to Class 1 or allocated and not used. In other words, the transmission algorithm used by Class 2 and 3 stations does not even look at ALLOC; only the allocation algorithm for Class 1 looks at ALLOC.

Class 3 and lower priority stations have no guaranteed pool of bandwidth available to them and hence have no guaranteed throughput. Thus, they may only transmit when the load falls below the arbitrary percentage established for that class. As previously discussed, Class 3 and lower priority stations make this determination based on the target time (or timer value) established for that class. For example, if the Class 2 target time is 8 milliseconds and the class 3 target time equated to 6 milliseconds, then whenever Class 2 load fell below 75 percent Class 3 would be able to transmit.

There are situations where a Class 1 station may want to increase the amount of Class 1 bandwidth allocated to it. For example, if a device such as a PBX is attached to a station, each time you establish a call or terminate a call the station would want to change the amount of allocated Class 1 bandwidth for that station to reflect the current load.

Those skilled in the art will appreciate that the allocation of bandwidth for Class 1 service can be accomplished in one of at least five ways:

Through configuration limitation.

Through a central device which controls the allocation of bandwidth.

By including in the write token a field representing the current allocated bandwidth.

By a special token which circulates around the loop and collects the currently allocated bandwidth from all stations.

By a distributed message passing algorithm for determining the current allocation of bandwidth. In the preferred embodiment of the present invention, the mechanism used for allocation of bandwidth for Class 1 service is to use a special token which is transmitted around the loop.

When a station desires to allocate additional Class 1 bandwidth, it captures the write token and transmits a bandwidth allocation token (FIG. 3). This bandwidth allocation token includes a field for accumulating the allocated bandwidth of all stations (ALLOCATED). This field is initialized to the current allocation of the station transmitting the bandwidth allocation token. Each Class 1 station on the loop takes the bandwidth allocation token, adds to the allocated field (ALLO- CATED) the amount of bandwidth which is currently allocated by that station to Class 1, and forwards the bandwidth allocation token to the next station. When the bandwidth allocation token returns to the station attempting to allocate bandwidth, the write token is regenerated and passed on to the next station. If the current allocation of bandwidth returned in the bandwidth allocation token (ALLOCATED) field plus the desired additional allocation is less than or equal to the allocatable bandwidth (ALLOC), then the allocation is granted. In such case the additional bandwidth desired is then added to the total bandwidth currently allocated for that station.

Figure 2:
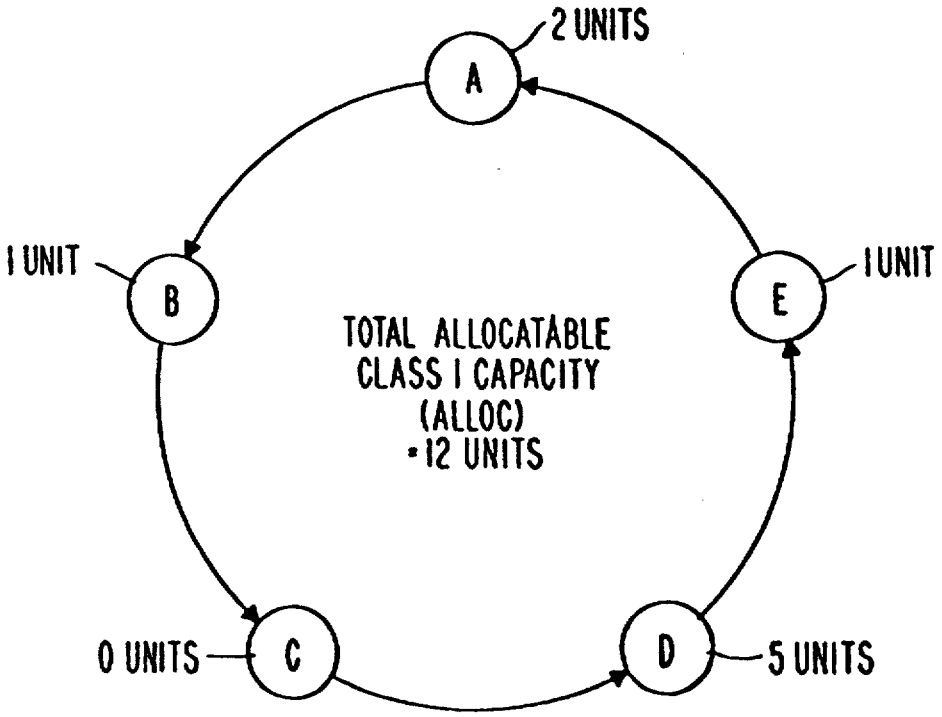
FIG. 2 illustrates a plurality of Class 1 stations interconnected in a loop structure, each station having a current Class 1 allocation of the number of units indicated.

As an example of the above operation, assume we have a loop as shown in FIG. 2 with all stations A, B,—, E being of Class 1, each station having the number of Class 1 units of bandwidth allocated to it as shown in the figure. Further assume that the loop has a capacity of 12 allocatable units of Class 1 bandwidth (=ALLOC). If station C wants to allocate additional bandwidth to itself, it captures the write token, and sends out a bandwidth allocation token with O in the allocation field ALLOCATED (since C currently has 0 units allocated to it). When the allocation token is received by station D, 5 units are added to the ALLOCATED field and the allocation token is transmitted to station E. This process continues until the bandwidth allocation token arrives back at station C with a value of 9 in the ALLOCATED field. Station C compares the value in the allocation field ALLOCATED against the loop capacity of 12 (as specified by ALLOC). Since there is a difference of 3 units between the value of the ALLOCATED field and ALLOC, station C may allocate up to three additional units of Class 1 bandwidth. If C was trying to allocate only one additional unit, it would change its current allocation register from 0 to 1. Subsequently, if station C received a bandwidth allocation token, it would add 1 unit to the ALLOCATED field; viz., its current allocation. Note that when station C is finished using its 1 unit of allocated Class 1 bandwidth, it will change its current allocation register back to 0 units. Similarly, when other Class 1 stations no longer required part or all of their currently allocated bandwidth, they will also reduce the value in their current allocation register accordingly.

Figure 4A:
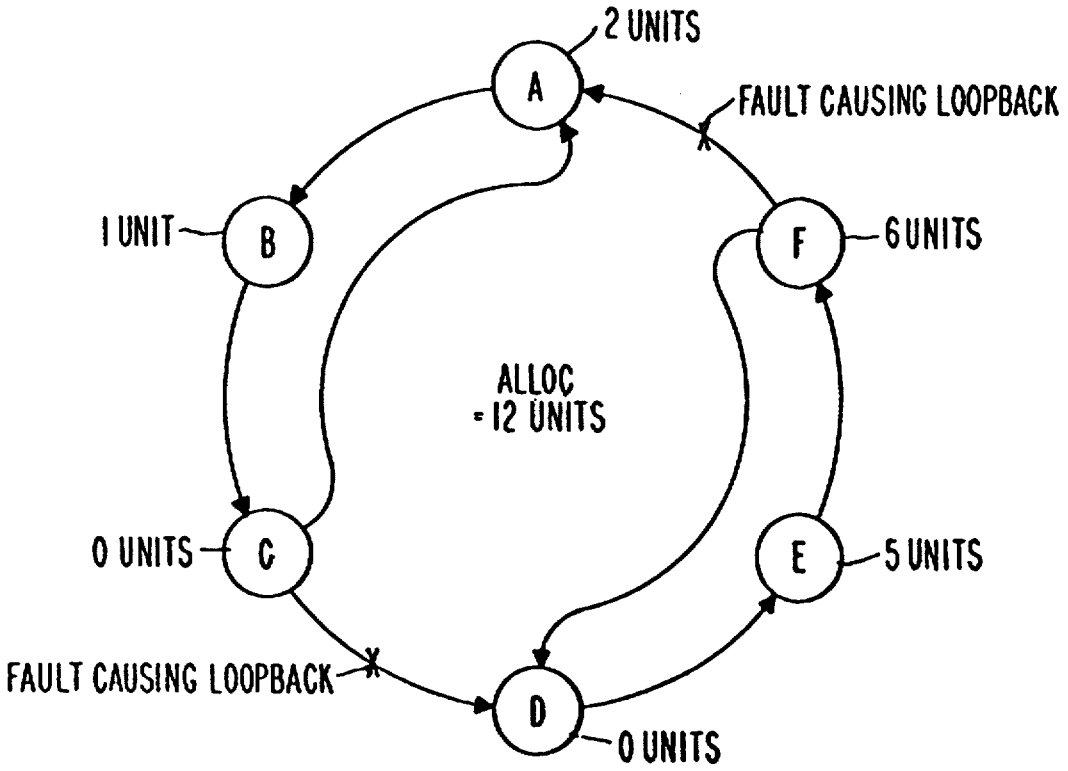
FIG. 4A illustrates a single loop with rebundant transmission paths, having been restructured into two separate fragmentary loops after the occurrence of the two indicated faults and the invocation of loopback. Each station shown is Class 1 priority and has a current Class 1 allocation as indicated.
Figure 4B:
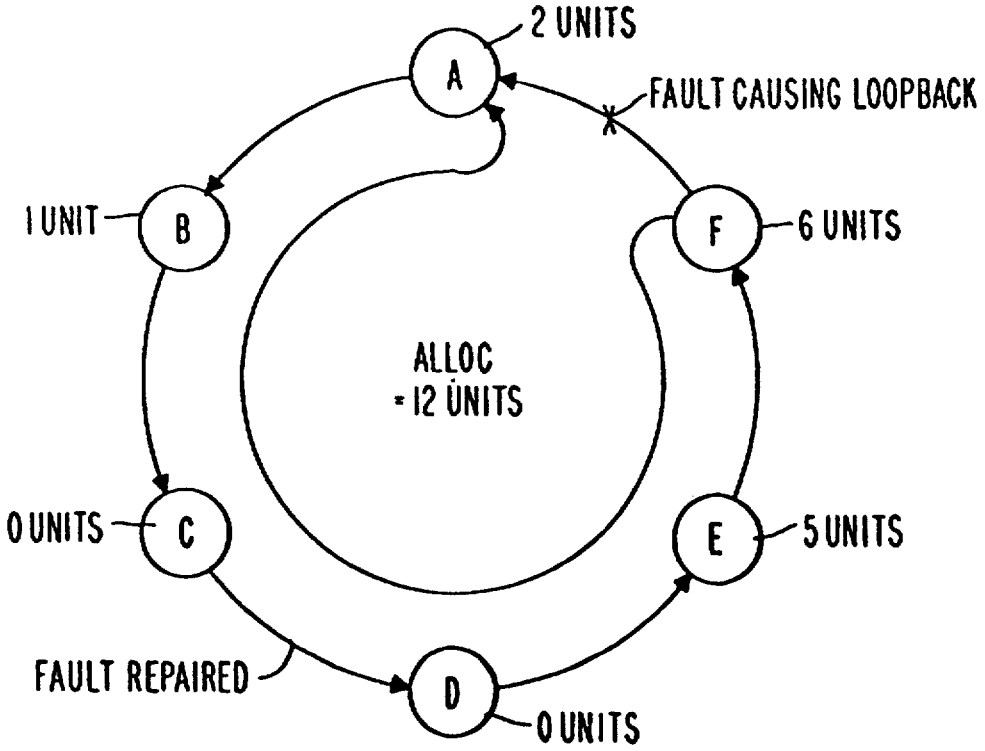
FIG. 4B is similar to FIG. 4A, but illustrates the configuration after the failure betwen stations C and D has been repaired, wherein the two separate loops of FIG. 4A have begun to function as a single loop.

Under one particular failure condition it is possible for a Class 1 station to receive a bandwidth allocation token wherein the value in the ALLOCATED field exceeds the total allocatable Class 1 bandwidth (ALLOC). Thus for example, a loop having redundant transmission paths and using loopback for reliability will fragment into separate loops when multiple failures occur (FIG. 4A). A description of the loopback mechanism is contained in U. S. Pat. No. 4,190,821, issued to Thomas R. Woodward on Feb. 26, 1980, which is incorporated by reference. Upon repair of one of the failures, the two separate loops will begin functioning as a single loop (FIG. 4B). Before repair, the two loop fragments operate using the same bandwidth allocation procedure. Hence both loop fragments in FIG. 4A have less than the ALLOC amount (=12 units) of bandwidth allocated. But when repair of the fault between stations C and D rejoins the loops (FIG. 4B), the current allocation is larger than ALLOC.

As an example, assume in FIG. 4B that station C wanted to allocate additional bandwidth. When the allocation token arrived at station A, the ALLOCATED field would specify 11 units. In such case, station A would detect that the currently allocated Class 1 bandwidth exceeded ALLOC, and would respond by terminating all sessions since it could only have a current allocation of 1 unit. Since station A terminated all sessions, it would change its current allocation to 0 and when the allocation token arrived at station B the ALLOCATED field would still specify 11 units. Station B would not be required to terminate its sessions since it could still maintain its current allocation of 1 unit without the total current allocation exceeding ALLOC (=12 Units). However, the request for additional allocation made by station C could not be granted since if granted the total current allocation would exceed ALLOC.

Alternatively, station A could deallocate 1 unit of bandwidth and maintain a portion of its sessions. In such case, station A would add 1 unit to the ALLOCATED field of the allocation token. Thus, when the allocation token reached station B, the ALLOCATED field would specify 12 units. Station B would detect that the currently allocated Class 1 bandwidth exceeded ALLOC (if station B maintained its current allocation), and respond by terminating all of its sessions since it could no longer have a current allocation of 1 unit. Thus when the allocation token arrived at station C, the ALLOCATED field would specify 12 units, and the request made by station C could not be granted since ALLOCATED was already equal to ALLOC.

In the preferred embodiment of the present invention, under normal conditions only one write token circulates around the loop. Station failures or transmission errors may cause the loss of the write token. The determination of when the write token has been lost is quite simple in the present timed token loop because of the target token rotation time. Thus, the absolute worst case time for rotation of the write token is less than or equal to two times the target token rotation time (TTRT). This worst case time occurs under the extremely unlikely conditions that all of the bandwidth is currently allocated to Class 1 (no C2POOL) and all of the bandwidth is being used by Class 1 stations on one rotation and on the next rotation all stations cease to transmit.

Therefore, if the time since the previous arrival of a write token at a station (of any class or classes) is greater than two times the target token rotation time, the station knows that the write token has been lost. In response to detecting the loss of the write token, the station will initiate a bidding cycle to recover the token. The bidding cycle is initiated by the station transmitting a recovery token (FIG. 3) with its individual address in the destination address (DA) field. The next station receiving the recovery token passes it on if the destination address in the recovery token is greater than its own individual address, replaces the destination address with its own individual address if the destination address is smaller than its own individual address, or wins the bid and regenerates the write token when the destination address in the recovery token is equal to its own individual address. Thus, the station with the highest individual address wins the bid and regenerates the write token.

Those skilled in the art will appreciate that the bidding algorithm may easily be modified so that the station having the lowest individual address will win the bid and regenerate the write token.

It should be noted that the same bidding process used to regenerate a lost write token may also be utilized to generate a wite token when the network is initialized.

The discussion will next briefly consider the formats of the tokens and data frame (FIG. 3) and the station's response upon the receipt of incoming information.

All stations on the loop look at all incoming information. If the destination addressed (DA) specified in a data frame equals the receiving station's individual address, the data frame will be buffered if there is no room in the station's buffer. The network allows for creation of status indications (in the EFD field) for error control and flow control on data frames. If a received data frame has a bad cyclic redundancy check (in the frame check sequence field), a status bit in the EFD field will be set to NAK. If the station has no room to buffer the frame, a status bit in the EFD field will be set to indicate the buffer full condition. On the other hand, if the frame is buffered a status bit in the EFD field will be set to ACK. If the destination address of a frame is not that of the station, the frame is repeated to the next station without change, except in the case described below.

Each station also looks at the source address of every received data frame. If the source address is equal to the station's individual address, the frame has made one complete revolution of the loop. The status indicated in the EFD field is captured and used to control retransmission. The station invalidates the frame by either placing an abort sequence in the frame or by removing the frame from the loop. This prohibits multiple receptions of the same frame by its continuing to rotate around the loop under very light load.

The following description describes the characteristics of the hardware used to implement a station. Although a detailed description of the hardware is not included, the description is sufficient to enable those skilled in the art to make and use the invention.

Referring to FIG. 3, information is carried on the loop (or ring) in frames which include unique identifiers for start of frame and end of frame. The start frame delimiter (SFD) indicates whether the frame is one of the tokens used for management of the loop or is a data frame. The end frame delimiter (EFD) includes a status field which is used to indicate positive or negative acknowledgment of the frame, buffer status and other status indications. The data frame has two addresses, the destination address (DA) and the source address (SA). User data and any user control information is carried in the information field (INFO) of the data frame. The frame check sequence field (FCS) is used to detect errors in transmission.

The various fields in the token formats have functions similar to those described for correspondingly named fields in the data frame format. The exact positioning of the fields in the token and data formats and the meaning assigned to the various status bits is not critical to the operation of the present invention. Thus, those skilled in the art will appreciate that modifications to the formats shown in FIG. 3 may be made without departing from the spirit of the present invention.

In the preferred embodiment of the present invention, information transmitted on the loop is encoded in a dual frequency format which produces three values, "1", "0", and "violation". The violation value is used to define SFD and EFD. However, those skilled in the art will appreciate that other data transmission formats may be more appropriate to a particular application.

Figure 5:
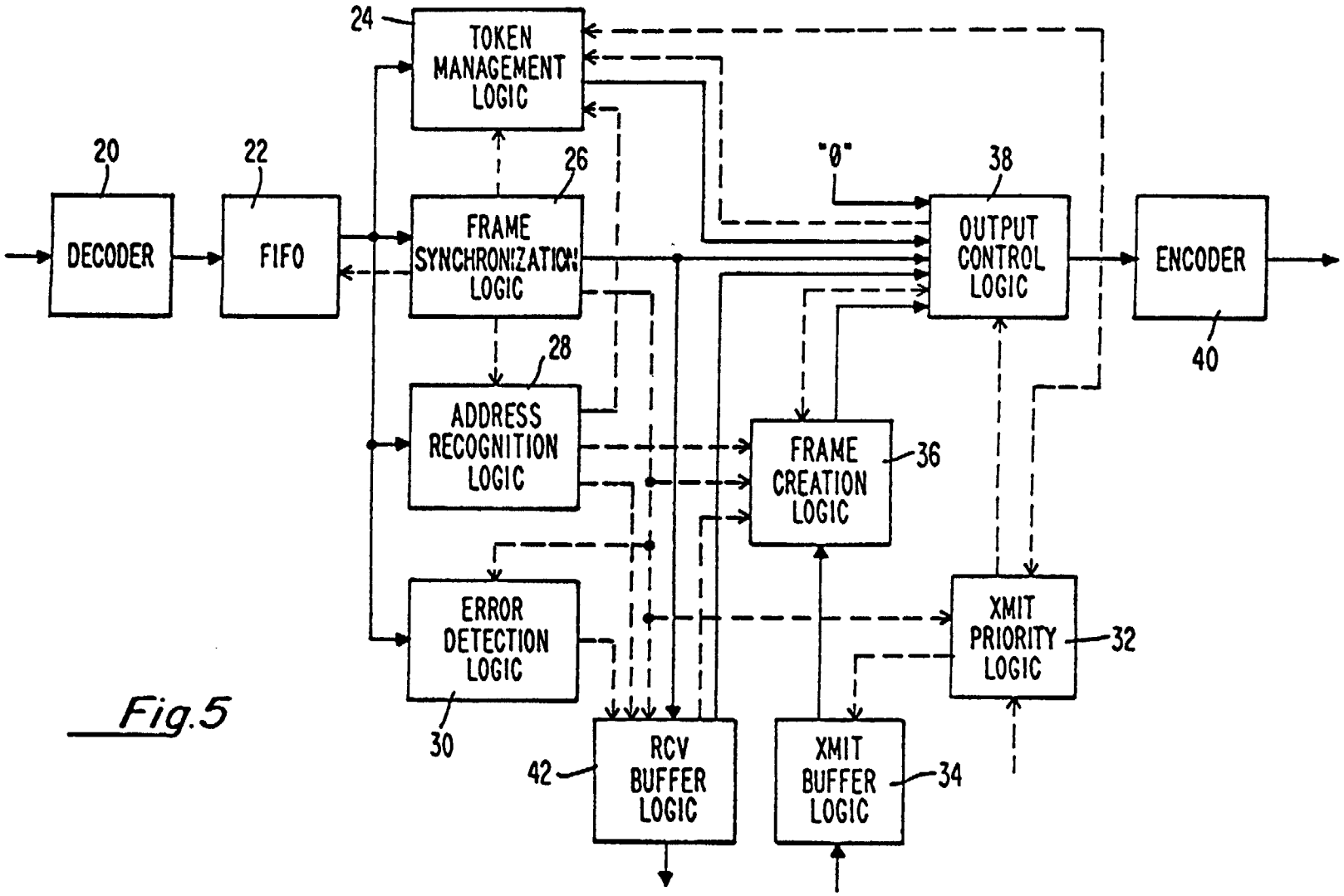
FIG. 5 shows a block diagram of the loop logic included in each station attached to the loop.

FIG. 5, shows a block diagram of the ring logic provided for each station on the loop. In FIG. 5, solid lines indicate actual data flow and broken lines indicate control information. The broken line entering the bottom of the transmit priority logic 32 is the control interface from the data device(s) (not shown) supported by and included in each station. The data lines leaving the bottom of the receive buffer logic 42 and entering the bottom of the transmit buffer logic 34 are data interfaces which allow the data device(s) (i.e., facsimile units, storage devices, etc.) to receive/transmit information from/to the ring logic. As will be obvious to those skilled in the art, these data interface lines are normally coupled to some logic on the data bus of the data device(s). Signals received from the loop are fed into a decoder 20 where a clock is extracted and the data is clocked into the first in/first out queuing unit (FIFO) 22. The choice of whether a centralized or decentralized clock is utilized is not important. In the preferred embodiment of the invention a decentralized clock is utilized; viz., each station runs off of an independent clock. In such a situation, the difference in rates between the received clock and a station's internal clock can cause the need to insert or delete bits between frames. This is accomplished by the FIFO 22. Thus, the FIFO 22 will add or delete bits between frames to compensate for rate disparities between crystals in different stations. The design of the FIFO 22 is dependent on the clocking system being used, the quality of crystals and other parameters. The design of a FIFO 22 to accommodate the particular network's characteristics will be obvious to those skilled in the art.

It should be noted that the FIFO's 22 length is an important factor in determining the maximum frame length MAXFRAME. Thus, MAXFRAME is dependent on how many bits of padding the frame creation logic 36 inserts between frames, the length of the FIFO 22 and other factors such as how many stations are in the loop and the method of clocking used. The tradeoff between these variables will be apparent to those skilled in the art.

The data output from the FIFO 22 sources four parallel sections of logic: the token management logic 24; the frame synchronization logic 26; the address recognition logic 28; and the error detection logic 30. The frame synchronization logic 26 scans the data coming in from FIFO 22 looking for start frame delimiters (SFDs). Upon detection of a start frame delimiter, the frame synchronization logic determines whether the frame is a data frame or a token based on the coding of the start frame delimiter. The design of the frame synchronization logic is dependent on the coding scheme used to indicate start frame delimiters (SFDs) and end frame delimiters (EFDs). Thus for example, if a HDLC/BDLC type of zero insertion was used to create the unique patterns identifying SFD and EFD, the frame synchronization logic 26 would have to find those flag patterns and also remove the inserted zeros in non-flag fields. In the preferred embodiment, illegal coding sequences are used to indicate delimiters and identify whether a data frame or one of the three types of tokens has been received.

If the frame synchronization logic 26 detects a token, the token management logic 24 is notifed by the frame synchronization logic 26. The token can be one of three types: a write token, a recovery token, or a bandwidth allocation token. In response to the frame synchronization logic 26 notifying the token management logic 24 that a write token has been received, the token management logic 24 will reset an internal timer (not shown) which is doing timeouts for recovery of the write token. That is, the internal timer will be reset to its initial value of two times the TTRT. Note that this internal timer is also set to its initial value when a station joins the loop. If a write token is received, the transmit priority logic 32 is notifed by the token management logic 24. The transmit priority logic 32 includes the C2 timer, C3 timer, token holding timer, and lateness register, none of which are shown. Upon the transmit priority logic 32 being notified of the receipt of a write token, the transmit priority logic 32 will load the token holding timer and reset the C2 and C3 timers in accordance with the procedure specified earlier. If information has been queued for transmission in the transmit buffer logic 34 and the timers for the classes queued have not decremented to zero, information will be taken from the buffers (not shown) in the transmit buffer logic 34 and run through the frame creation logic 36 where a start frame delimiter, the source address, the frame check sequence and end frame delimiter are appended.

The design of the frame creation logic 36 is dependent on the data structure used in the transmit buffer logic 34, the ordering of fields of the data frame, and the method used for creating frame delimiters. In the preferred embodiment, the only information stored in the transmit buffer logic 34 is the information field and the destination address. Thus, the frame creation logic 36 puts on a start frame delimiter (SFD), adds the source address (SA), generates the frame check sequence (FCS) and adds the end frame delimiter (EFD). With the functions performed by the frame creation logic 36 now understood, suffice it to say that the design of the frame creation logic 36 will be obvious to those skilled in the art.

The frame constructed in the frame creation logic 36 is transferred to the output control logic 38 which in turn supplies the data frame to the encoder 40. The output control logic 38 is a multiplexor, responsive to inputted control signals, for gating to the encoder 40 one of the output control logic's 38 data inputs in accordance with the received control signals. Its design is well known to those skilled in the art. The encoder 40 encodes the data frame into whatever data transmission format is being utilized (i.e., NAZ, dual frequency) and transmits the encoded data frame onto the loop. The transmission of information continues until the allowed holding time for the write token (as indicated by the token holding timer) has expired or until all queues information in the transmit buffer logic 34 has been transmitted. The output control logic 38 then causes the write token to be regenerated by the token management logic 24, and the regenerated write token is gated from the token management logic 24 through the output control logic 38 to the encoder 40.

If the token received is a recovery token, the token management logic 24 uses the control signals from the address recognition logic 28 to determine whether the destination address (DA) in the recovery token is less than, equal to, or greater than the station's address. The address recognition logic 28 includes a simple comparator to perform the comparison and supplies the token management logic 24 with control signals indicating the result of the comparison. If the destination address is greater than the station's address, the recovery token is gated through the output control logic 34 into the encoder 40 and back onto the loop unimpeded. If the destination address in the recovery token is less than the station's address, the recovery token's DA is replaced with the station's address and the modified recovery token is gated out onto the loop. If the destination address in the recovery token is equal to the station's address, the station has won the bid to recover the write token. In such case, a new write token is generated (by the same mechanism used to generate a write token after completing the transmission of data frames) and gated out onto the loop. As previously mentioned, this bid mechanism allows only the station with the highest address to regenerate a write token after it is lost.

If the token received is a bandwidth allocation token, the allocation field (ALLOCATED) in the token is added to the current allocation for the station (which is stored in the token management logic 24) by the token management logic 24. If the result of this calculation is greater than total amount of Class 1 bandwidth which is allowed to be allocated on the ring (ALLOC), the token management logic 24 notifies the transmit priority logic 32 and the unaltered bandwidth allocation token is immediately transmitted out on the ring through the output control logic 38. As previously discussed, the latter situation can occur under the anomaly when two loops are joined together. If the result of this calculation is less than or equal to the total allocatable Class 1 bandwidth, the bandwidth allocation token is forwarded out onto the loop with the new total in the ALLOCATED field.

If the frame coming out of the FIFO 22 is not a token (viz., it's a data frame or a frame fragment), the address recognition logic 28 will buffer the frame in the receive buffer logic 42 if the frame's destination address is equal to (one of) the address(es) of the station, or cause the frame to be aborted if the station was the source of the frame (SA=station address). Note that a station may recognize multiple addresses; viz., its station address, a broadcast address and (in some network implementations) a generic address. If the station's address is neither the source nor the destination specified in the frame, the frame is transmitted through the station unimpeded.

The address recognition logic 28 uses timing signals from the frame synchronization logic 26 to supply signals from the address recognition logic 28: to the token mangement logic 24 indicating the result of recovery token address comparison; to the frame creation logic 36 for aborting frames, and to the receive buffer logic 42 for frame and acknowledgment reception.

If the frame's destination address is equal to the station's address(es), the receive buffer logic 42 will attempt to store the frame. If the station was the source of the frame, the frame creation logic 36 inserts an abort sequence into the frame. The abort sequence in the preferred embodiment is a frame delimiter (not shown in FIG. 3). After modifying the frame to indicate an abort condition, the station retransmits the modified frame back onto the loop.

When comparing for destination addresses, the address recognition logic 28 will match both a unique station identifier as well as any broadcast addresses which the station has been conditioned to recognize. If the destination address of the frame matches the station's unique identifier or broadcast address, the received buffer logic 42 causes an update of the status field of the frame that is being received based on internal buffer conditions and control signals the receive buffer logic 42 receives from the error detection logic 30 (which computes the CRC). The receive buffer logic 42 accomplishes this status update by signaling the frame creation logic 36 to modify the end frame delimiter. In both the case of broadcast frames and nonbroadcast frames, after updating the status the modified frame will be transmitted back onto the loop.

Those skilled in the art will appreciate that it is possible to implement all protocol functions (except token recovery and bandwidth allocation) in 1 bit of delay from FIFO 22 output to encoder 40 input by performing functions in parallel.

Having shown and described the preferred embodiment of the present invention, those skilled in the art will realize that various omissions, substitutions and changes in forms and details may be made without departing from the spirit of the invention. It is the intention, therefore, for the invention to be limited only as indicated by the scope of the following claims.

What is claimed is:

1. In a loop communications network including a loop-connected set of stations providing data flow unidirectionally from one of said stations to the next, each of said stations being capable of passing data through itself along the loop, extracting data from the loop or injecting data into the loop, each of said stations having associated with it at least one individual address, the right of each of said stations to source new information into the network controlled by passing a write token from one of said stations to another, only one of said write tokens circulating around the loop under normal conditions, a method of generating said write token at initialization of said network or regenerating a lost write token, said method comprising the steps of:

each station measuring the time duration since the last receipt of said write token; and in response to a first one of said stations detecting that said measured time duration exceeds a preset amount of time, said first one of said stations will initiate a bidding cycle to recover the write token.

2. The method in accordance with claim 1 wherein said bidding cycle includes the following steps:

said first station generating a recovery token, said recovery token including a destination address, the destination address in the recovery token generated including the individual address associated with said first station;

said first station transmitting said generated recovery token onto the loop.

3. The method in accordance with claim 2 further including the following additional steps:

each one of said stations receiving one of said recovery tokens comparing the destination address in that said received recovery token with the individual address associated with that said receiving station;

if the destination address in that said received recovery token is greater than the individual address associated with that said receiving station, that said receiving station will transmit that said received recovery token back onto the loop with the destination address unaltered; and if the destination address in that said received recovery token is less than the individual address associated with that said receiving station, that said receiving station will replace the destination address in that said recovery token with the individual address associated with that said receiving station and transmit the modified recovery token back onto the loop.

4. The method in accordance with claim 2 further including the following additional steps:

each one of said stations receiving one of said recovery tokens comparing the destination address in that said received recovery token with the individual address associated with that said receiving station;

if the destination address in that said received recovery token is less than the individual address associated with that said receiving station, that said receiving station will transmit that said received recovery token back onto the loop with the destination address unaltered; and if the destination address in that said received recovery token is greater than the individual address associated with that said receiving station, that said receiving station will replace the destination address in that said recovery token with the individual address associated with that said receiving station and transmit the modified recovery token back onto the loop.

5. The method in accordance with claim 3 or 4 further including the following additional steps:

if the destination address in that said received recovery token is equal to the individual address of that said receiving station, that said receiving station will generate a new write token and transmit the new write token onto the loop.

6. The method in accordance with claim 5 wherein the individual address associated with each one of said stations is uniquely different than the individual address associated with other ones of said stations.

7. The method in accordance with claim 5 wherein said preset amount of time is dependent on a target token rotation time, the target token rotation time chosen so that under a one hundred percent offered load on the loop, the write token will revolve at the target token rotation time.

8. The method in accordance with claim 5 further including the steps of:

assigning to each of said stations on the loop a Class 1 priority, a Class 2 priority, or both of said Class 1 and Class 2 priorities; and each of said Class 2 stations limiting the transmission of information onto the loop based on the observed write token rotation time.

9. The method in accordance with claim 8 further including the steps of:

allocating to the set of stations including all Class 1 stations a first portion of the bandwidth available on said loop; and each Class 1 station requiring bandwidth reserving a portion of the first portion of bandwidth, wherein the sum of the reserved Class 1 bandwidth does not exceed the first portion of the bandwidth.

10. The method in accordance with claim 5 further including the steps of:

assigning to each one of a first subset of said stations on the loop a Class 2 priority; and each of said Class 2 priority stations limiting the transmission of information onto the loop based on the observed write token rotation time.

11. The method in accordance with claim 10 further including the steps of:

assigning to each one of a second subset of said stations on the loop a Class 1 priority;

allocating to the second subset of said stations a first portion of the bandwidth available on said loop; and each Class 1 priority station requiring bandwidth reserving a portion of the first portion of bandwidth, wherein the sum of the reserved Class 1 bandwidth does not exceed the first portion of the bandwidth.

12. In a logical loop communications network, said network including a bus connected set of stations on a broadcast medium wherein a logical ordering of said stations is enforced by passing a write token from one of said stations to another in a predictable order with the last station in the order passing the write token to the first station in the order, each of said stations being capable of passing data through itself along the logical loop, extracting data from the logical loop or injecting data into the logical loop, each of said stations having associated with it at least one individual address, only one of said write tokens circulating around the logical loop under normal conditions, a method of generating said write token at initialization of said network or regenerating a lost write token, said method comprising the steps of:

each station measuring the time duration since the last receipt of said write token; and in response to a first one of said stations detecting that said measured time duration exeeds a preset amount of time, said first one of said stations will initiate a bidding cycle to recover the write token.

13. The method in accordance with claim 12 wherein said bidding cycle includes the following steps:

said first station generating a recovery token, said recovery token inlcuding a destination address, the destination address in the recovery token generated including the individual address associated with said first station;

said first station transmitting said generated recovery token onto the logical loop.

14. The method in accordance with claim 13 further including the following additional steps:

each one of said stations receiving one of said recovery tokens comparing the destination address in that said received recovery token with the individual address associated with that said receiving station;

if the destination address in that said received recovery token is greater than the individual address associated with that said receiving station, that said receiving station will transmit that said received recovery token back onto the logical loop with the destination address unaltered; and if the destination address in that said received recovery token is less than the individual address associated with that said receiving station, that said receiving station will replace the destination address in that said recovery token with the individual address associated with that said receiving station and transmit the modified recovery token back onto the logical loop.

15. The method in accordance with claim 13 further including the following additional steps:

each one of said stations receiving one of said recovery tokens comparing the destination address in that said received recovery token with the individual address associated with that said receiving station;

if the destination address in that said received recovery token is less than the individual address associated with that said receiving station that said receiving station will transmit that said received recovery token back onto the logical loop with the destination address unaltered; and if the destination address in that said received recovery token is greater than the individual address associated with that said receiving station, that said receiving station will replace the destination address in that said recovery token with the individual address associated with that said receiving station and transmit the modified recovery token back onto the logical loop.

*16. In a loop communications network including a loop-connected set of stations for providing data flow unidirectionally from one of said stations to the next, each of said stations being capable of passing data along the loop, extracting data from the loop or transmitting data onto the loop, the right of at least a plurality of said stations to transmit data onto the loop being controlled by a write token circulating around the loop, only one of said write tokens circulating around the loop under normal conditions, a method of determining when a write token is lost, said method comprising performing at a first station the steps of measuring the time duration since its last receipt of a write token from another station, and determining whether the token is lost by detecting whether said time duration exceeds a particular amount.*

*17. The method in accordance with claim 16, wherein the steps performed by said station includes the step of transmitting recovery data onto said loop in response to detecting that said time duration exceeds said predetermined amount.*

*18. The method in accordance with claim 16, or 17, wherein a plurality of said stations perform said steps of said first mentioned station.*

*19. In a loop communications network including a loop-connected set of stations providing data flow unidirectionally from one of said stations to the next, each of a plurality of said stations being capable of passing data along the loop, receiving data from the loop or transmitting data onto the loop, the right of each of said plurality of stations to transmit data onto the loop being controlled by a write token circulating around said loop, only one of said write tokens circulating around the loop under normal conditions, a method of regenerating a lost token comprising the steps of: measuring at a first station the time duration since its last receipt of a write token from another station, determining whether the token is lost by detecting at said first station whether the measured time duration exceeds a particular amount, transmitting from said first station predetermined data onto said loop in response to detecting that said measured time duration exceeds said particular amount, and, following receipt by a plurality of said stations of said predetermined data, causing a station to generate a new write token onto said loop.*

*20. In a loop communications network including a loop-connected set of stations providing data flow unidirectionally from one of said stations to the next, each of a plurality of said stations being capable of passing data along the loop, receiving data from the loop or transmitting data onto the loop, the right of each of said plurality of stations to transmit data onto the loop being controlled by a write token circulating around said loop, only one of said write tokens circulating around the loop under normal conditions, a method comprising the steps of: measuring at each of a plurality of stations the time duration since its last receipt of a write token from another station, determining whether the token is lost by detecting at each of said plurality of stations whether the measured time duration exceeds a particular amount, transmitting predetermined data*

*from a station in response to the station detecting that its measured time duration exceeds said particular amount, and, following receipt by a plurality of said stations of said predetermined data, causing a station to generate a write token onto said loop.*

*21. In a loop communications network including a loop-connected set of stations providing data flow unidirectionally from one of said stations to the next, each of a plurality of said stations being capable of passing data along the loop, receiving data from the loop or transmitting data onto the loop, the right of each of said plurality of stations to transmit data onto the loop being controlled by a write token circulating around said loop only one of said write tokens circulating around the loop under normal conditions, a method comprising the steps of: measuring at each of a plurality of stations the time duration since its last receipt of a write token from another station, determining whether the token is lost by detecting at each of said plurality of stations whether the measured time duration exceeds a particular amount, initiating a bidding cycle in response to a station detecting that its measured time duration exceeds said particular amount, and generating a write token onto said loop by a station selected in accordance with said bidding cycle.*

*22. In a logical loop communications network, said network including a bus connected set of stations wherein a logical ordering of said stations is enforced by passing a write token from station-to-station in a predictable order with the last station in the order passing the write token to the first station in the order, each of said stations being capable of passing data along the loop, receiving data from the logical loop or transmitting data onto the logical loop only one of said write tokens circulating around the loop under normal conditions, a method of determining when a write token is lost said method comprising: performing at a first station the steps of measuring the time duration since its last receipt of a write token from another station, and determining whether the token is lost by detecting whether said time duration exceeds a particular amount.*

*23. The method in accordance with claim 22, wherien the steps performed by said station includes the step of transmitting recovery data onto said loop in response to detecting that said time duration exceeds said predetermined amount.*

*24. The method in accordance with claim 22, or 23, wherein a plurality of said stations perform said steps of said first mentioned station.*

*25. In a logical loop communications network, said network including a bus connected set of stations wherein a logical ordering of said stations is enforced by passing a write token from station-to-station in a predictable order with the last station in the order passing the write token to the first station in the order, each of said stations being capable of passing data along the logical loop, receiving data from the logical loop or transmitting data onto the logical loop, a method of regenerating a lost token comprising the steps of: measuring at a station the time duration between receipt of write tokens, detecting at said station whether the measured time duration exceeds a particular amount, transmitting from said station predetermined data onto said loop in response to detecting that said measured time duration exceeds said particular amount, and, following receipt by a plurality of said stations of said predetermined data, causing a station to generate a new write token onto said loop.*

*26. In a logical loop communications network, said network including a bus connected set of stations wherein a logical ordering of said stations is enforced by passing a write token from station-to-station in a predictable order with the last station in the order passing the write token to the first station in the order, each of said stations being capable of passing data along the logical loop, receiving data from the logical loop or transmitting data onto the logical loop, a method comprising the steps of: measuring at each of a plurality of stations the time duration between receipt of write tokens, detecting at each of said plurality of stations whether the measured time duration exceeds a particular amount, transmitting predetermined data from a station in response to the station detecting that its measured time duration exceeds said particular amount, and, following receipt by a plurality of said stations of said predetermined data, causing a station to generate a write token onto said loop.*

*27. In a logical loop communications network, said network including a bus connected set of stations wherein a logical ordering of said stations is enforced by passing a write token from station-to-station in a predictable order with the last station in the order passing the write token to the first station in the order, each of said stations being capable of passing data along the logical loop, receiving data from the logical loop or transmitting data onto the logical loop, a method comprising the steps of: measuring at each of a plurality of stations the time duration between receipt of write tokens, detecting at each of said plurality of stations whether the measured time duration exceeds a particular amount, initiating a bidding cycle in response to a station detecting that its measured time duration exceeds said particular amount, and generating a write token onto said loop by a station selected in accordance with said bidding cycle.*

*28. In a loop communications network including a loop-connected set of stations providing data flow uni-directionally from one of said stations to the next, each of said stations being capable of passing data through itself along the loop, extracting data from the loop or injecting data into the loop, each of said stations having associated with it at least one individual address, the right of each of said stations to source new information into the network controlled by passing a write token from one of said stations to another, only one of said write tokens circulating around the loop under normal conditions, a method of generating said write token at initialization of said network or regenerating a lost write token, said method comprising the steps of:*

*each station measuring the time duration since its last receipt of said write token from another station; and*

*in response to a first one of said stations detecting that said measured time duration exceeds a preset amount of time, said first one of said stations will initiate a bidding cycle to recover the write token.*

*29. In a logical loop communications network, said network including a bus connected set of stations on a broadcast medium wherein a logical ordering of said stations is enforced by passing a write token from one of said stations to another in a predictable order with the last station in the order passing the write token to the first station in the order, each of said stations being capable of passing data through itself along the logical loop, extracting data from the logical loop or injecting data into the logical loop, each of said stations having associated with it at least one individual address, only one of said write tokens circulating around the logical loop under normal conditions, a method of generating said write token at initialization of said network or regenerating a lost write token, said method comprising the steps of:*

*each station measuring the time duration since its last receipt of said write token from another station; and*

*in response to a first one of said stations detecting that said measured time duration exceeds a preset amount of time, said first one of said stations will initiate a bidding cycle to recover the write token.*

* * * * *